March 14, 1961
L. M. RHEINGOLD ET AL
2,974,704
CUTTING AND FORMING DIE
Filed Sept. 14, 1955
3 Sheets-Sheet 1
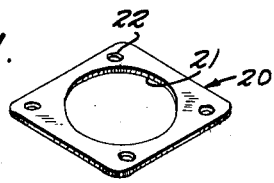
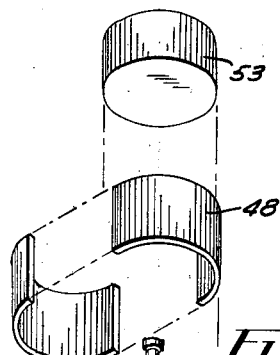
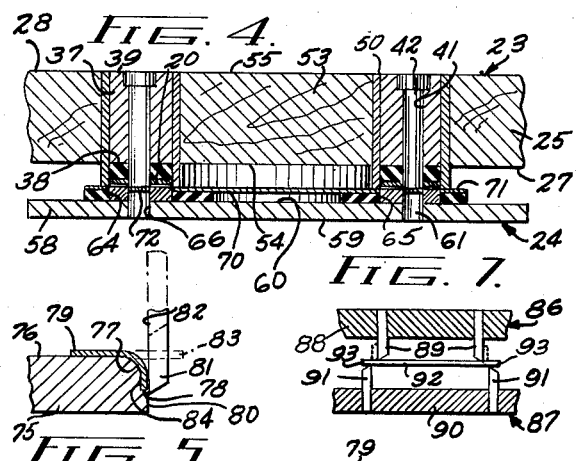
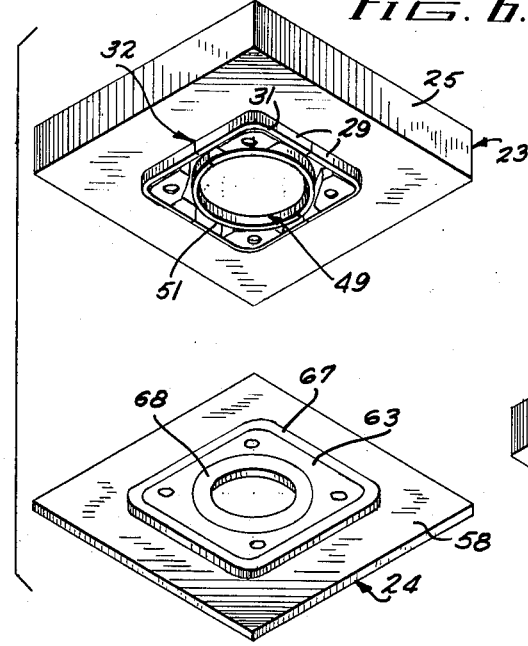
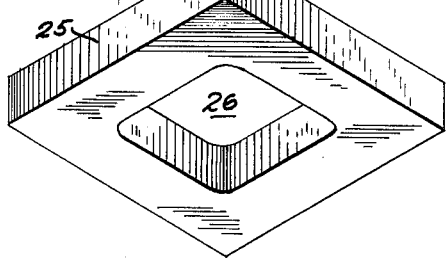
INVENTORS.
LAWRENCE M. RHEINGOLD
MILTON BERLIN
BY
ATTORNEY.

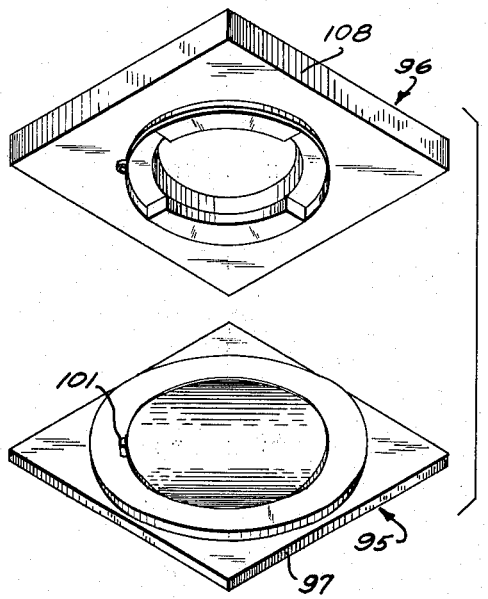
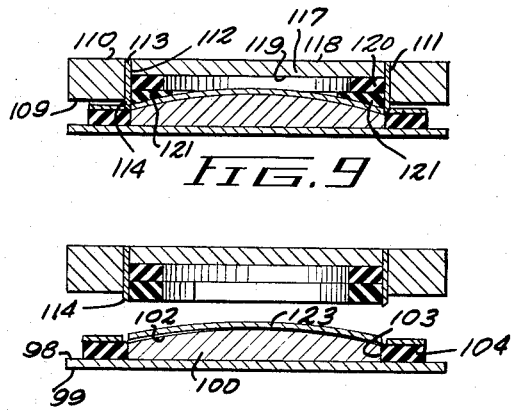
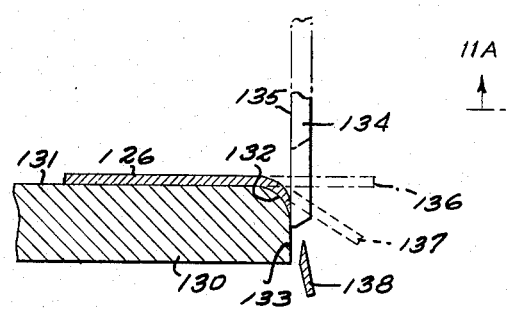
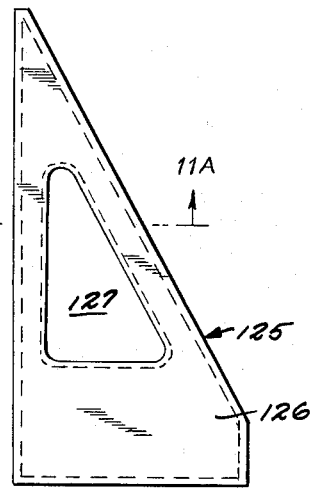

March 14, 1961 L. M. RHEINGOLD ET AL 2,974,704
CUTTING AND FORMING DIE
Filed Sept. 14, 1955 3 Sheets-Sheet 3

INVENTORS.
LAWRENCE M. RHEINGOLD
MILTON BERLIN
BY
ATTORNEY.

United States Patent Office 2,974,704
Patented Mar. 14, 1961

2,974,704

CUTTING AND FORMING DIE

Lawrence M. Rheingold, Brooklyn, and Milton Berlin, Forest Hills, N.Y., assignors to Templet Industries Incorporated, Brooklyn, N.Y., a corporation of New York Filed Sept. 14, 1955, Ser. No. 534,231

5 Claims. (Cl. 153—2)

This invention relates generally to tools or dies for working sheet metal, and is particularly directed to highly improved dies for economically manufacturing stampings in short production runs.

The particular embodiment of the present invention, which is illustrated in the drawings and which will be described hereinafter in greater detail, comprises generally a pair of blocks adapted to be removably mounted in a press for movement toward and away from each other, a blade or rule secured in one of the blocks and projecting therefrom toward the other block, and a punch member projecting from the other block and having a configuration complementary to that of the blade for coacting with the latter to shape a piece of sheet metal interposed between the blade and punch member upon movement of the blocks toward each other.

While it has been attempted in the past to fabricate dies of rules or blades held in blocks of wood, metal and fiber, such dies have been unsatisfactory for numerous reasons. For example, prior blade or rule type dies were unable to satisfactorily cut sheet metal of substantial thickness, say over 16 gage (BS) aluminum, even for very short runs. Further, prior rule type dies produced sharply burred edges on the blanked metal, which was extremely expensive to finish, more so than the saving made in the initial tooling. While special counters have been provided which reduced burring, operation with such counters frequently deformed the blades or rules and destroyed uniformity and accuracy of the blanks produced. In addition, prior rule or blade type die constructions were incapable of forming, bending or drawing the blanks, so that such blanks required an entirely separate forming operation, or the use of highly expensive compound dies and double-acting presses.

It is, therefore, a general object of the present invention to provide a highly improved rule or blade type die construction which overcomes the above-mentioned difficulties, is capable of working any material up to ¼ inch steel, and which produces completely burr-free stampings to close tolerances, so that no deburring or other finishing is required.

It is another object of the present invention to provide a blade or rule type die construction for working sheet metal, which is adapted to blank or form, or both blank and form the metal to produce a complete stamping in one stroke. Hence, the die construction of the present invention may be employed with standard single stroke presses, and effect considerable reduction in both the cost of dies and other equipment. Moreover, metal working operations with the instant die construction may be performed at full press speed and by operators of relatively low skill level.

It is a further object of the present invention to provide a rule or blade type die which is extremely simple and inexpensive in construction, and use, being capable of producing from five to ten thousand stainless steel stampings without reduction in product quality. Further, a worn or fatigued blade can be quickly and easily replaced in the die. As the dies are very light and easy to handle, and readily set up in a press, the replacement of a rule or of an entire die may be accomplished quickly and the run resumed with little loss of time.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

Fig. 1 is a perspective view showing a blank capable of being produced by the dies of the present invention.

Fig. 2 is a perspective view showing a pair of mating dies for producing the blank of Fig. 1.

Fig. 3 is an exploded perspective view of the upper die of Fig. 2.

Fig. 4 is a partial, sectional view showing the dies of Fig. 2, operating on a piece of sheet metal.

Fig. 5 is a diagrammatic view illustrating a bending operation as performed by dies of the present invention.

Fig. 6 is a sectional view showing a stamping bent according to Fig. 5.

Fig. 7 is a diagrammatic view illustrating another bending operation performed by dies of the present invention.

Fig. 8 is a perspective view showing another pair of dies constructed in accordance with the present invention.

Fig. 9 is a sectional view illustrating the dies of Fig. 8 operating on a piece of sheet metal.

Fig. 10 is a view similar to Fig. 9 at a slightly later stage in the metal working operation.

Fig. 11 is a plan view showing a stamping adapted to be formed by the instant dies.

Fig. 11A is a sectional view taken through the stamping of Fig. 11 substantially along the line 11A—11A.

Fig. 12 is a diagrammatic view illustrating the die operating in forming the stamping of Fig. 11.

Figure 13:
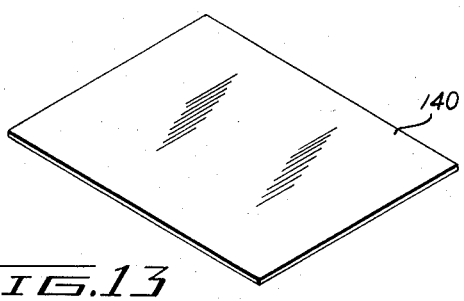
Fig. 13 is a perspective view showing a piece of sheet material before being worked.

Referring now more particularly to the drawings, and specifically to Figs. 1–4 thereof, the blank of Fig. 1, generally designated 20, is a substantially flat piece of sheet metal having a generally rectangular outline configuration with rounded corners. A generally circular central cutout 21 and a plurality of spaced smaller holes 22 are formed in the blank 20.

A pair of dies, generally designated 23 and 24, are illustrated in Figs. 2 and 4. The die 23 includes a generally rectangular base block 25, which may be fabricated of wood, metal or other suitable material, plywood having been found entirely satisfactory. As best seen in Fig. 3, the base block 25 is formed with a generally rectangular central opening or hole 26. The opening or hole 26 extends entirely through the thickness of the base block 25, opening at opposite ends through its inner face or surface 27 and its outer face or surface 28, and is of a shape similar to, but slightly larger in all dimensions than the outline configuration of the blank 20.

Inserted in the hole 26 and extending conformably about the bounding edge of the hole are a plurality of rule or blade sections 29, preferably fabricated of high carbon steel. The blade sections are illustrated as being identical and comprising four in number, each blade section being bent at substantially a right angle intermediate its ends. Hence, the blade sections may be arranged in end to end abutting relation to define a rectangle, and in such arrangement form a rectangle of just sufficient size to conformably fit in the block opening 26. The blade sections 29 are all of equal width, and their width is appreciably greater than that of the base block 25, so that if one edge 20 of each blade section is flush with the outer face 28 of the base block, the other blade edge 31 will extend continuously along and project appreciably from the inner block surface 27. As noted hereinbefore, the block opening 26 is of similar shape, but greater dimensions than the outline configuration of the blank 20. More specifically, the difference in dimensions between the blank 20 and opening 26 is equal to twice the thickness of a blade section 29, so that the interior surfaces of the blade sections 29 combine to define a configuration precisely congruent to that of the blank 20. While a plurality of the blade sections 29 have been illustrated and described, the sections combine to define a continuous blade, generally designated 32, which may, if preferred, be fabricated of a single strip bent to the desired configuration.

An inner, smaller block 37 is provided of approximately the same thickness as the base block 25 and substantially congruent to the blank 20. The block 37 is thus adapted to be press fit into the blade 32, which lines the base block opening 26, and have its inner and outer surfaces 38 and 39, respectively, substantially flush with the inner and outer surfaces 27 and 28 of the base block. Formed centrally of the block 37 is a through opening or hole 40 substantially congruent to the hole 21 of the blank 20; and, a plurality of spaced bores 41 extend transversely through the block 37 for respectively receiving headed pins 42. As seen in Fig. 4, the bores 41 are countersunk through the block surface 39 for receiving the pin heads, and the other ends of the pins project inwards beyond the block surface 38 substantially even with the blade edge 31.

Circumposed about the projecting end of each pin 42, and secured adhesively or otherwise in facing engagement with the block surface 38, is a resilient member or stripper 46. The stripper members may advantageously be fabricated of rubber, and are of a thickness substantially equal to or greater than the amount of projection of blade 32 beyond the block surface 38.

Conformably inserted into the inner block opening 40, as by a force fit, are a pair of blade sections or rules 48 each bent to define a generally semi-circular segment and combining to define a circular blade or rule 49 having its external surface precisely congruent to the blank opening 21. The blade 49 is of the same width as the blade 32, and has one edge 50 substantially flush with the surface 39 of the inner block 37, while its other edge 51 projects appreciably from and extends along the inner surface of the smaller block 37. The projecting edge 51 of the blade 49 is preferably substantially flush or level with the projecting edge 31 of the blade 32.

A plug 53 of generally circular configuration may be force-fit into the circular blade 49, and is preferably of such thickness as to have its inner surface 54 level with the inner surfaces 27 and 38 of the base block 25 and inner block 37, and its outer surface 55 substantially level with the outer surfaces 23 and 39 of the base block and inner block. By this construction, the die 23 defines a firm and rigid assembly and is adapted to be mounted in a press (not shown) with its outer surface against a backing plate of the press. Hence, the outer, non-projecting edges of the blades 32 and 49, as well as the headed ends of the pins 42, will abut and be firmly backed up by the press.

The die 24 includes a generally rectangular base block or plate 58 having generally parallel outer and inner surfaces 59 and 60, and provided with a plurality of spaced bores or holes 61 adapted to be aligned with the pins 42. Fixedly secured in facing engagement with the inner surface 60 of the base block 58 is a punch member or plate 63, which is substantially identical in configuration to the blank 20. The punch member may be secured to the base block 58 by threaded fasteners or other suitable means (not shown) and projects by its thickness from the inner face 60 of the base block. Specifically, the punch member 63 has an external bounding edge 64 of rectangular configuration identical to that of the blank 20, a central opening defined by an internal bounding edge 65 identical to the central blank opening 21, and a plurality of spaced, through holes 66 shaped and arranged identical to the holes 22 of the blank. Resilient stripper material, such as rubber or the like, is secured, as by adhesive means, to the inner face 60 of the base block 58, and arranged at 67 extending along the punch member edge 64, and at 68 extending along the internal punch member edge 65. In their normal, unstressed condition, the strippers 67 and 68 are at least level with the punch member and may project beyond the latter.

The die 24 is adapted to be arranged in a press with the outer surface 59 of the base block 58 abutting against a backing plate of the press, and with the inner base block surfaces 27 and 60 facing toward each other movable toward and away from each other upon operation of the press. Further, the dies 23 and 24 are arranged in the press so that the pins 42 are in respective alignment with the punch member openings 66, and the punch member itself is in alignment with the space between the blades 32 and 49. Further, the external bounding edge 64 of the punch member 63 is even with and engages the internal surface of the blade 32, while the internal punch member edge 65 is even with and engages the external surface of the blade 49. As best seen in Fig. 4, there is clean shearing action upon a piece of sheet metal interposed between the dies 23 and 24 when the latter are moved together in a press, wherein the blade 49 coacts with the internal edge 65 of the punch member to cut out a circular, central portion 70 of the sheet metal, and the blade 32 cooperates with the external punch member edge 64 to trim a sheet portion 71 about the external edge of the blank 20, while the sheet portions 72 are punched by the pins 42 into the holes 66. In the blanking operation, the sheet portions 70 and 71 are depressed below the working face of the punch member 63 against the strippers 68 and 67, while the blank 20 is forced into the space between the blades 49 and 32 against the strippers 46. Upon movement of the dies 23 and 24 away from each other, the strippers will expand to remove or strip their respective sheet portions from the dies.

While the dies described hereinbefore operate in pure shear, such dies may also be constructed to bend or draw sheet metal without shear, as schematically illustrated in Fig. 5. A punch member 75 has one surface 76 contoured, as by a curved or rounded marginal portion 77 which terminates in an upwardly facing shoulder 78. The shoulder 78 is of a width substantially equal to the thickness of the sheet metal 79 to be formed, so as to space the curved surface portion 77 from the bounding edge 80 of the punch member a minimum distance equal to the sheet metal thickness. A blade or rule 81 is movable vertically with one side 82 even and engageable with the punch member edge 80. Thus, when the blade is raised to its dot-and-dash outline position, and a generally flat piece of sheet metal 79, as indicated in dashed outline at 83, is superposed on the contoured punch member surface 76, movement of the blade toward the punch member will effect pure bending of the sheet metal to its solid line position at 84 between the blade surface 82 and the curved portion 77 of the contoured punch member surface 76. The bent piece 79 is illustrated in section in Fig. 6, as of annular configuration with the bent portion 84 defining an internal flange or lip.

In Fig. 7 is diagrammatically illustrated another form of bending die construction including dies 86 and 87. The die 86 comprises a base block 88 and a punch which may take the form of one or more blades 89 projecting from the die block. The die 87 includes a block 90 and blades 91 each spaced from the adjacent punch blade a distance equal to the thickness of the sheet metal 92. Hence, when the dies 86 and 87 are moved toward each other with the sheet metal 92 interposed therebetween, the edge portions 93 of the sheet metal will be bent into the dotted line positions in the spaces between the blades 89 and 91. This arrangement may be employed to form sheet metal channels, cups, and other shapes, according to whether the blades 89 and 91 are straight, annular, etc.

Dies constructed in accordance with the present invention may also be employed to blank and bend on a single stroke, which heretofore required the use of complex dies in double-acting presses, a prohibitively expensive procedure for short run production. In Figs. 8, 9 and 10 are illustrated a pair of dies, generally designated 95 and 96, which are adapted to completely shape, by both blanking and bending, on a single movement of the dies toward each other.

The die 95 includes a die block 97 having generally parallel inner and outer faces 98 and 99, respectively. Fixedly secured in facing engagement on the inner block surface 98 is a punch member 100, shown for purposes of illustration as being generally circular in configuration and having a laterally projecting nipple or lug 101. The punch member 100 may be secured to the base block 97 by threaded fasteners (not shown) or other suitable means, and has its inner surface 102 contoured or curved to produce a similarly contoured stamping, as will appear presently. In the illustrated embodiment, it will be noted that the peripheral bounding edge 103 of the punch member 100 is substantially normal to the inner surface 98 of the base block 97 and intersects at an angle with the contoured punch member surface 102. A stripper 104 of suitable resilient material extends closely about the peripheral edge 103 of the punch member 100 and is secured, adhesively or otherwise, to the base block surface 98.

The die 96 includes a base block 108 having generally parallel inner and outer surfaces 109 and 110, respectively, and provided with a central hole 111 opening through the inner and outer faces and of a configuration complementary to but slightly larger than that of the punch member 100. Inserted snugly within the base block opening 111 and extending conformably about the bounding edge thereof is a rule or blade 112 which is of greater width than the base block. The blade 112 has its outer edge 113 substantially flush with the outer surface 110 of the base block 108, and has its inner edge 114 extending along and projecting from the inner base block surface 109. The blade 112 is of such thickness that the area bounded by the inner surface of the blade is precisely congruent to the area bounded by the peripheral edge 103 of the punch member 100.

Force fit into the block opening 111 to retain the blade 112 in position is an inner block or plug 117, which has its outer side 118 substantially flush with the outer side 110 of the block 108, and has its inner side spaced interiorly of the block.

In the illustrated embodiment, the punch member 100 has its upper contoured surface 102 medially crowned with lower side regions, as best seen in Figs. 9 and 10. An annular stripper 120 is secured to the inner surface 119 of the plug 117 extending about the inner side of the blade 112, and a pair of arcuate segments of resilient stripper material 121, 121 are secured to opposite regions of the annulus 120, which in their normal, unstressed condition project approximately to the blade edge 114 or slightly therebeyond, see Fig. 10.

The die 96 is also adapted to be mounted in a press and arranged for movement toward and away from the die 95 with the inner surface of the blade 112 even and engageable with the bounding edge 103 of the punch member 100. A piece of sheet material 123 interposed between the dies 95 and 96 will thus be blanked or sheared congruent to the punch member 100. Further, the blade 112 and the resilient material 121, which builds up the stripper 120 adjacent to the lower regions of the contoured punch member surface 102, serve to depress the sheet 123 into conforming engagement with the contoured punch member surface during the shearing. Upon movement of the dies 95 and 96 away from each other, see Fig. 10, the sheet 123 has been formed into a completed stamping having the desired outline configuration and bent or formed with a contour similar to that of the punch member surface 102.

Another form of combined shearing and bending adapted to be produced on one stroke by die constructions of the present invention is illustrated in Figs. 11, 11A and 12. The resultant article or stamping 125 of Figs. 11 and 11A includes a flat major sheet portion 126 formed with an opening 127. Extending about the peripheral margin of the sheet portion 126 and bent at right angles thereto is a blunt edge peripheral flange 128, while the marginal portion bounding the opening 127 is bent and sheared to define a flange 129 having a relatively sharp edge. The peripheral flange 128 may, of course, be formed by the pure bending die constructions illustrated in Figs. 5 and 7 and described hereinbefore, while the sharp edge flange 129 may be formed by the die construction diagrammatically illustrated in Fig. 12. In Fig. 12, a punch member 130 has a contoured surface 131 formed with a curved or rounded or marginal portion 132 merging smoothly with the punch member edge 133. A die blade 134 is arranged for vertical movement between the solid and dot-and-dash line positions with its inner surface 135 even and engageable with the punch member edge 133. The sheet 126, being initially flat, as indicated in dot-and-dash outline at 136, and arranged on the surface 131 of the punch member, will be bent through an intermediate position 137 and subsequently bent and sheared, as indicated in solid lines. The piece removed by shearing is designated 138. While this die construction will produce a bend having a very sharp edge, it is appreciated that the blade 134 may be spaced from the punch member edge 133 any distance less than the thickness of the sheet 126 to effect combined bending and shearing without producing a sharp edge.

Figs. 13, 14, 14A, 15, 15A illustrate a further form of the present invention. A flat piece of sheet metal 140 is illustrated in Fig. 13 as the starting piece in forming a stamping. The sheet 140 is pressed between the dies 141 and 142, as in Fig. 14A, to form a sheet 143 having a raised portion 144. That is, the sheet portion 144 is offset out of the plane of remainder of the sheet 143.

Figure 14A:
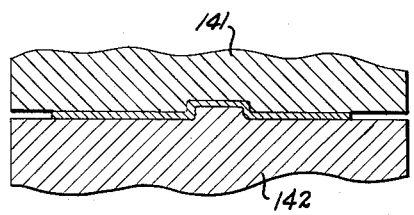
Fig. 14A is a sectional view illustrating the piece of Fig. 14 being formed.
Figure 14:
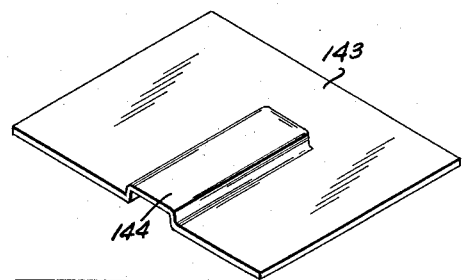
Fig. 14 is a perspective view showing the piece of Fig. 13 subsequent to a forming operation.
Figure 15A:
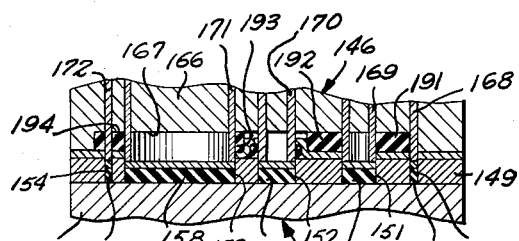
Fig. 15A is a partial sectional view showing the piece of Fig. 15 being worked by dies of the present invention.
Figure 15:
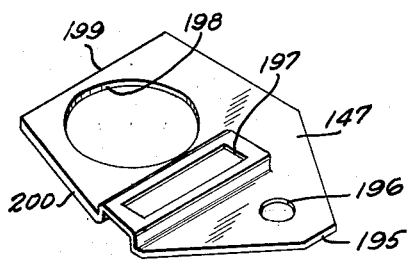
Fig. 15 is a perspective view showing the piece of Fig. 14 after being operated on by dies of the present invention.

In Fig. 15A are illustrated a pair of dies generally designated 145 and 146 for forming the finished stamping 147 of Fig. 15 from the intermediate blank 143 of Fig. 14. The die 145 includes a base block 148 and a punch member 149 fixedly secured on the base block by any suitable means. The punch member is formed with a plurality of openings 150, 151, 152, 153 and 154, in which are respectively disposed resilient strippers 155, 156, 157, 158 and 159.

The die 146 includes a base block 166 having one surface 167 facing toward the die 145. Fixedly secured in and projecting from the facing surface 167 of the die block 166 are a plurality of blades or rules 168, 169, 170, 171, and 172, which are respectively engageable in the punch member openings 150, 151, 152, 153 and 154, upon movement of the dies 145 and 146 toward each other. Interposed between the blades are resilient strippers, stripper 191 lying between blades 168 and 169, stripper 192 lying between blades 169 and 170, stripper 193 lying between blades 170 and 171, and stripper 194 between blades 171 and 172. When a pressed sheet 143 is interposed between the dies 145 and 146 to form the stamping 147, the blade 168 severs the stamping edge 195, the blade 169 cuts out the hole 196, the blade 170 cuts the hole 197, the blade 171 cuts the hole 198, and the blade 172 severs the edge 199. The cutout portions are forced into the punch member openings 150–154, and the stamping 147 is forced onto the blades 168–172. Upon movement of the dies 145 and 146 away from each other, the strippers remove the cutout pieces from the punch member openings, and the finished stamping 147 from the blades. In this modification is illustrated the cutting of openings in different levels of a stamping, as the openings 197 and 198. Also illustrated is the continuous shear of different levels of the stamping, as along the edge 200.

From the foregoing it is seen that the present invention provides a die construction which fully accomplishes its intended objects, and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

Having thus described our invention, what we claim as new and desire to secure by Letters Patent, is:

1. In a die set for blanking and shaping sheet metal: a male die member and a female die member adapted to be mounted in alignment for movement toward and away from one another, said female die member constituting a base block having an opening therein of predetermined contour, die blade means continuously extending around and in contact with the edge of said opening so as to define a closed hollow shape including a longitudinal edge portion protruding beyond said base block in a direction toward said male die member, the inner face of the die blade being generated by a straight line extending parallel to the direction of relative movement of said die members and running to the edge of the die blade and forming an angle with said edge, an inner block located within the die blade means and clamping said die blade means between said inner die block and said base block, said male die member comprising a punch extending toward said female die member and having a plan contour complementary to and in registry with the plan contour of the shape defined by the die blade means, said punch member having an externally convex non-planarly contoured surface facing toward the female die member for bending sheet metal operated upon by the die set.

2. A die set as set forth in claim 1 wherein the punch member has a peripheral setback around at least a part of its plan contour, said setback having a width substantially equal to the thickness of the sheet metal, whereby when a piece of sheet metal is operated upon by the die set which piece is larger than the shape defined by the die blade means a portion of the sheet metal will be bent into said setback.

3. A die set as set forth in claim 1 wherein at least a portion of the punch which faces the female die member is depressed toward its periphery.

4. A die set as set forth in claim 1 wherein at least a portion of the punch which faces the female die member is rounded toward its periphery.

5. A method of blanking and shaping sheet metal comprising bringing to bear on one face of the sheet metal a female die member constituting a projecting die blade the inner face of which is generated by a straight line perpendicular to the sheet metal and extending to the edge of the die blade and forming an angle with such edge, the female die member defining a closed hollow shape, and bringing to bear on the opposite face of the sheet metal a male die member in alignment with the female die member and having a shape complementary to that of the closed hollow shape defined by the die blade, said male die member having an externally convex non-planarly contoured surface facing toward the female member so that as the sheet metal is blanked it is deformed and bent to match the contour of said surface of the male die member.

References Cited in the file of this patent

UNITED STATES PATENTS

| Re. 24,450 | Sarno | Apr. 1, 1958 |
| 235,353 | Geldreich | Dec. 14, 1880 |
| 426,577 | Whittlesey et al. | Apr. 29, 1890 |
| 735,936 | Blakey et al. | Aug. 11, 1903 |
| 1,665,203 | Delf | Apr. 10, 1928 |
| 1,696,242 | Kochendorfer | Dec. 25, 1928 |
| 2,180,545 | Parsons et al. | Nov. 21, 1939 |
| 2,313,801 | Carll | Mar. 16, 1943 |
| 2,421,457 | Lindsay | June 3, 1947 |
| 2,495,221 | Berlin | Jan. 24, 1950 |
| 2,573,767 | Jensen | Nov. 6, 1951 |
| 2,636,253 | Rees | Apr. 28, 1953 |
| 2,699,134 | Maxwell | Jan. 11, 1955 |
| 2,754,906 | Gundlach | July 17, 1956 |
| 2,821,871 | Sarno | Feb. 4, 1958 |

FOREIGN PATENTS

| 583,949 | Great Britain | Jan. 3, 1947 |

OTHER REFERENCES

"Low-Cost Dies for Aircraft Parts," by Benhardt Schlenzig, in American Machinist, Nov. 12, 1942, pp. 1307–1314.